(12) United States Patent
Smith

(10) Patent No.: US 7,855,843 B2
(45) Date of Patent: Dec. 21, 2010

(54) OPTICAL FINGER NAVIGATION DEVICE WITH A FOLDED AIR LENS

(75) Inventor: George Edward Smith, Sunnyvale, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 176 days.

(21) Appl. No.: 12/027,884

(22) Filed: Feb. 7, 2008

(65) Prior Publication Data

US 2009/0201594 A1    Aug. 13, 2009

(51) Int. Cl.
*G02B 17/00* (2006.01)
(52) U.S. Cl. .................. 359/726; 359/727; 359/733; 359/736
(58) Field of Classification Search .......... 359/726, 359/727, 732, 733, 735, 736
See application file for complete search history.

(56) References Cited

U.S. PATENT DOCUMENTS 6,124,986 A *  9/2000  Sekita et al. ............... 359/691
2006/0208170 A1  9/2006  Xie

* cited by examiner

*Primary Examiner*—Jack Dinh

(57) ABSTRACT

A fingerprint navigation system with a folded air lens structure and a folded air lens. The system includes a light source, a folded air lens structure, a light reflector, and a navigation sensor. The folded air lens structure is aligned to direct light from the light source to an object surface. The folded air lens structure includes a first portion and a second portion. The light reflector is aligned to direct the light from the first portion of the folded air lens structure to the second portion of the folded air lens structure. The navigation sensor is calibrated to produce a navigation image corresponding to the light directed through the folded air lens structure and the folded air lens.

20 Claims, 5 Drawing Sheets

OPTICAL FINGER NAVIGATION DEVICE WITH A FOLDED AIR LENS

BACKGROUND OF THE INVENTION

An object navigation device is used to track the motion of, for example, a finger or fingerprint. Fingerprint navigation is done by illuminating the finger or fingerprint and tracking its motion across an object surface. As the finger moves across the surface, the motion is detected as a difference of two images recorded by an image sensor over a relatively short time frame. The light reflected by the illuminated finger passes through one or more optical lenses, for example, to change the magnification factor of the image. However, the use of optical lenses results in aberrations, comas, or other image distortion, in particular at the edges of the image. An aperture, or central stop, can be used to correct the aberrations, or distortion, as the light passes through the lenses.

FIG. 1 depicts a conventional air lens structure 10. In particular, the air lens structure 10 is a structure with an immersed medium separating a pair of transmissive surfaces. The air lens structure 10 includes an object surface 12 and an image surface 14. The air lens structure 10 also includes a first portion 24 with a first transmissive surface 16 and a second portion 26 with a second transmissive surface 18. The first transmissive surface 16 and the second transmissive surface 18 are separated by a converging air lens 22, which refracts light at the interfaces with the first and second transmissive surfaces 16 and 18. An aperture or central stop 20 is disposed in the air lens 22 between the first transmissive surface 16 and the second transmissive surface 18. Light reflected by an object at the object surface 12 passes through the first portion 24 and into the air lens 22, which projects the light through the aperture stop 20. The aperture stop 20 controls aberrations from the image as the light travels out of the air lens 22 and into the second portion 26 where the light is focused onto the image surface 14.

The conventional air lens structure 10 has two separate portions 24 and 26 and an embedded aperture stop 20 within the immersed air lens 22. This configuration of the conventional air lens structure 10 consumes a significant amount of space because of the linear alignment of the optical components, as well as the space required for the insertion of the aperture stop 20 to achieve the desired effect of controlling aberrations in the resulting image. The size of the conventional air lens structure 10 restricts the ability to use the structure in different applications. Additionally, embedding the aperture stop 20 between the first and second transmissive portions 24 and 26 complicates the manufacturing process and, hence, increases cost because the first and second portions 24 and 26 are typically manufactured as separate pieces and are then assembled together.

SUMMARY OF THE INVENTION

Embodiments of a system are described. In one embodiment, the system is a fingerprint navigation system. The system includes a light source, a folded air lens structure, a light reflector, and a navigation sensor. The folded air lens structure is aligned to direct light from the light source to an object surface. The folded air lens structure includes a first portion and a second portion. The light reflector is aligned to reflect the light from the first portion of the folded air lens structure to the second portion of the folded air lens structure. The navigation sensor is calibrated to produce a navigation image corresponding to the light directed to the navigation sensor. Other embodiments of the system are also described.

Embodiments of an apparatus are also described. In one embodiment, the apparatus is a folded air lens structure. The apparatus includes an object surface, a first transmissive surface of a first portion, and a second transmissive surface of a second portion. The first portion is coupled to the second portion in a unified structure. The object surface is where an object is illuminated by a light source. The first transmissive surface is aligned to direct light from the object surface. The second transmissive surface is aligned to accept the light from the first transmissive surface. The light is directed along a reflective path within the folded air lens from the first transmissive surface to the second transmissive surface. Other embodiments of the apparatus are also described.

Embodiments of a method are also described. In one embodiment, the method is a method for using a fingerprint navigation device. The method includes illuminating a navigation object at an object surface of a folded air lens structure to reflect light from the navigation object. The method also includes directing the reflected light through the folded air lens structure. The folded air lens structure includes a first portion and a second portion. The method also includes relaying the light from the first portion to the second portion through a folded air lens via a light reflector. The method also includes detecting the light to produce a navigation image. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
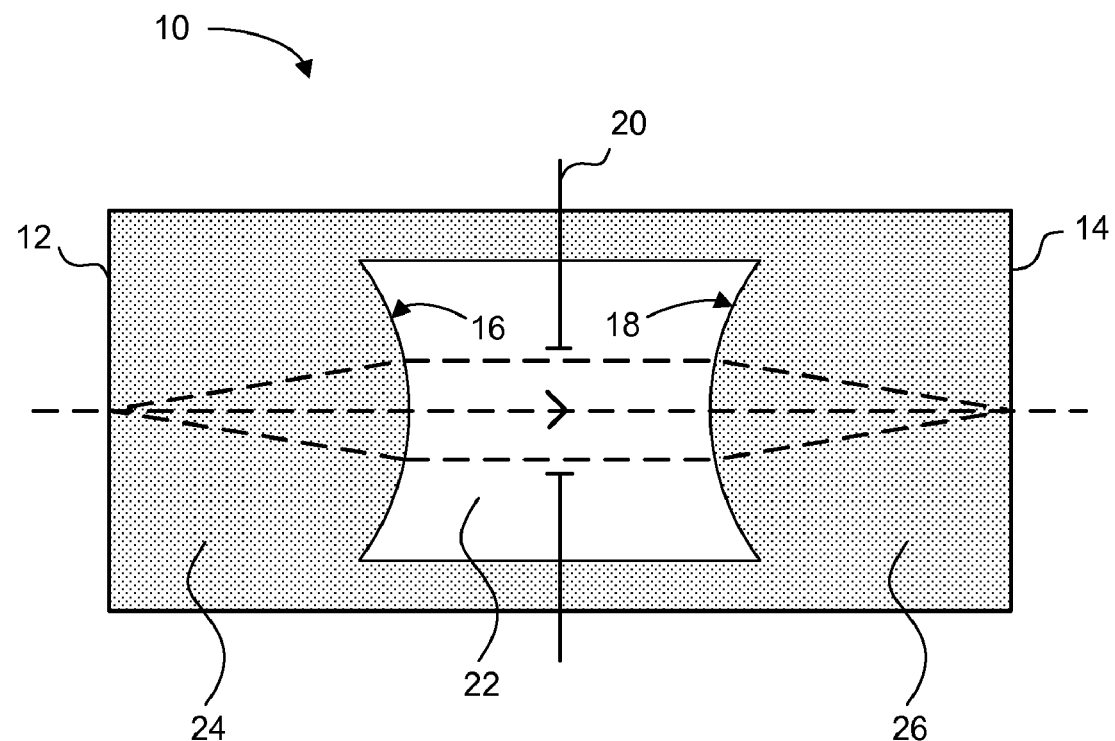
FIG. 1 depicts a conventional fingerprint navigation device.
Figure 2:
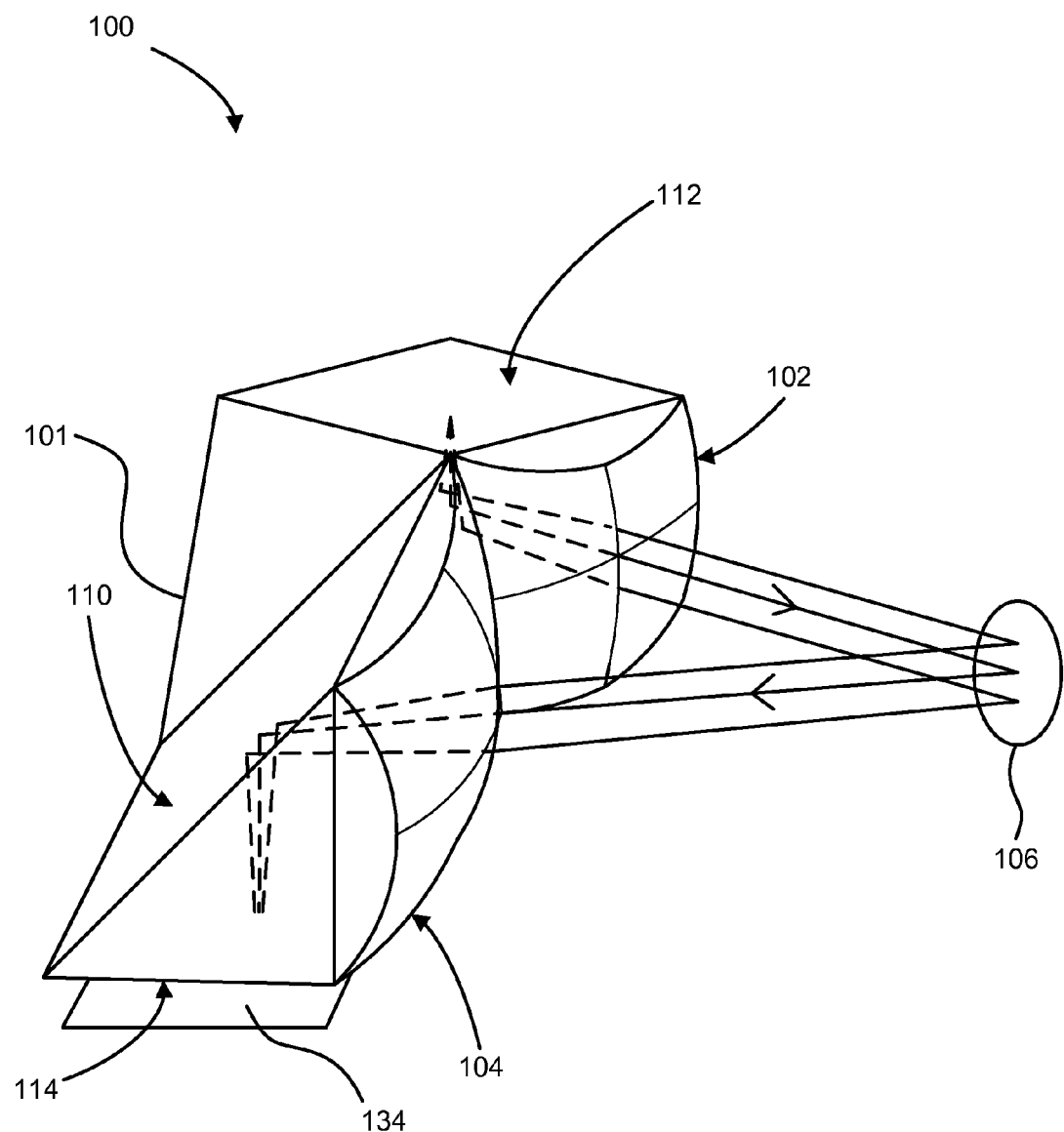
FIG. 2 depicts a perspective view of one embodiment of a fingerprint navigation system.

FIG. 2 depicts a perspective view of one embodiment of a fingerprint navigation system 100. The illustrated fingerprint navigation system 100 includes a folded air lens structure 101, a light reflector 106, and an image navigation sensor 134. The fingerprint navigation system 100 also includes a light source 132 (shown in FIG. 4). In one embodiment, the light source 132 illuminates a navigation object at an object surface 112 of the folded air lens structure 101. In particular, a navigation object is illuminated by the light from the light source 132. The light reflected by the navigation object is then reflected off a first portion reflective surface 108 (shown in FIG. 4) and through a first transmissive surface 102 of the folded air lens structure 101. The light is then reflected by the light reflector 106 back into the folded air lens structure 101 through a second transmissive surface 104. The second transmissive surface 104 transmits the light to a second portion reflective surface 110. The second portion reflective surface 110 directs the light to an image surface 114 where the image navigation sensor 134 is located. In this way, the folded air lens structure 101 directs the light from the object surface 112 to the image navigation sensor 134 via the light reflector 106. In one embodiment, the reflective surfaces 108 and 110 are oriented at an angle relative to the incident light so as to cause total internal reflection of the incident light.

Figure 3:
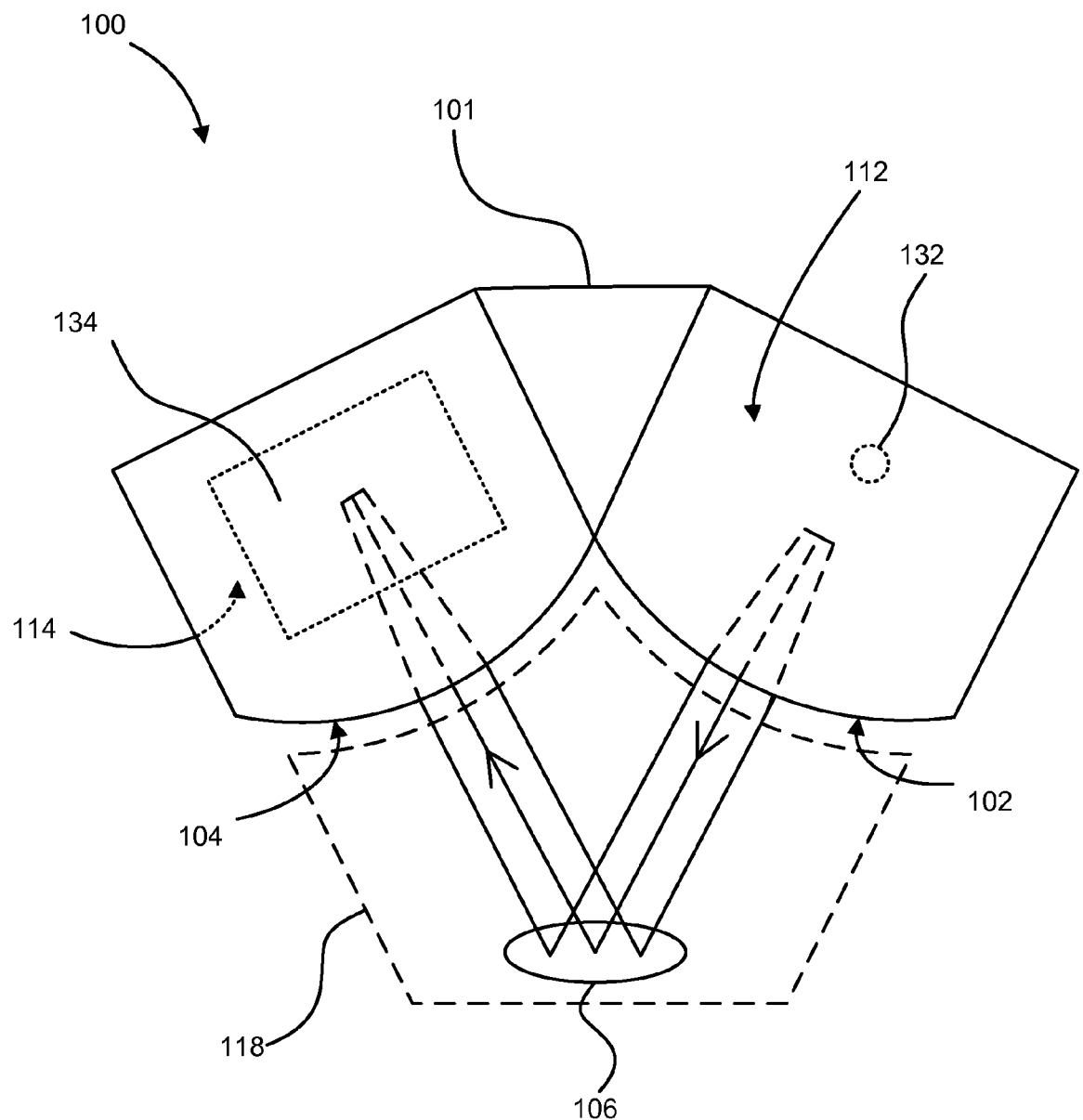
FIG. 3 depicts a top view of the fingerprint navigation system of FIG. 2.

In one embodiment, the first transmissive surface 102 and the second transmissive surface 104 at least partially define a folded air lens 118 (shown in FIG. 3). The lens functionality of the folded air lens 118 manifests in the refraction of the light at the interfaces between the folded air lens structure 101 and the adjacent air (i.e., the folded air lens 118), as light travels from the folded air lens structure 101 into the folded air lens 118 and back into another portion of the folded air lens structure 101. In general, the folded air lens 118 includes the path along which the light is directed as it is relayed via the light reflector 106. The folded air lens structure 101 relays light through the folded air lens 118.

One application of the fingerprint navigation system 100 is to process a sequence of images produced by the navigation sensor 134 to determine the motion of an object such as a finger on or at the object surface 112. For example, when a finger is placed on the object surface 112 and is illuminated by the light source 132, the resulting image of the finger, reflected as light at the object surface 112, is used as the navigation image. The reflected light is passed through the folded air lens structure 101, as described above. The navigation image sensor 134, located at the image surface 114, produces navigation images from the light, over time, and converts a sequence of navigation images into corresponding electrical signals that may be used to detail the motion of the finger by relative comparison of the signals generated over time.

FIG. 3 depicts a top view of the fingerprint navigation system 100 of FIG. 2. In particular, FIG. 3 illustrates the path the light travels from the object surface 112, through the first transmissive surface 102 to a folded air lens 118, and then to the light reflector 106. The light is then relayed by the light reflector 106, through the folded air lens 118, to the second transmissive surface 104 of the folded air lens structure 101. In particular, the light reflector 106 relays the light to the second transmissive surface 104 by reflecting the light back toward the second transmissive surface 104. The light is then focused onto the image surface 114 for detection of the navigation image by the image navigation sensor 134. In one embodiment, the first transmissive surface 102 corresponds to a first portion of the folded air lens structure 101, and second transmissive surface 104 corresponds to a second portion of the folded air lens structure 101, and the first and second portions of the folded air lens structure 101 are coupled in a unified structure. In some embodiments, the first transmissive surface 102 and the second transmissive surface 104 are oriented at a non-zero angle respective to each other and define, at least partially, the folded air lens 118. In one embodiment, the folded air lens 118 includes the space between the first and second transmissive surfaces 102 and 104 and the light reflector 106. It should be noted that, although the folded air lens 118 between the transmissive surfaces 102 and 104 and the light reflector 106 is referred to as a folded "air" lens 118, in some embodiments, the folded air lens 118 may be filled with another gaseous, liquid, or solid substance having a different index of refraction. Also, although the dashed lines representing the folded air lens 118 are shown at a distance from the first and second transmissive surfaces 102 and 104, embodiments of the folded air lens 118 may extend to and coincide with the first and second transmissive surfaces 102 and 104. Additionally, other embodiments of the folded air lens may be defined by other shapes.

Figure 4A:
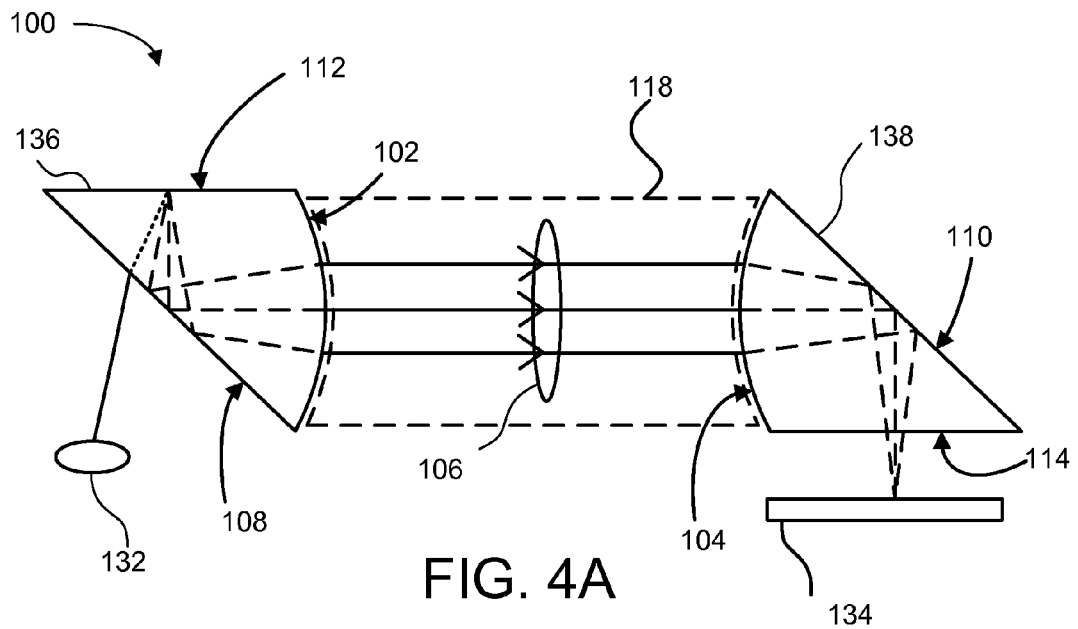
FIG. 4A depicts a functional view of the fingerprint navigation system of FIG. 2.

FIG. 4A depicts a functional view of the fingerprint navigation system 100 of FIG. 2. Although FIG. 4A depicts the first and second portions 136 and 138 separately in order to illustrate the functionality of the folded air lens structure 101, embodiments of the folder air lens structure 101 combine the first and second portions 136 and 138 as a single unitary structure. In particular, FIG. 4A illustrates the path that the light travels from light source 132 to the object surface 112. In one embodiment, the light source 132 is a light-emitting diode (LED), although other light sources or multiple light sources may be implemented. FIG. 4A also depicts the path of the light after it is reflected by a navigation object at the object surface 112. The light is reflected off the reflective surface 108 of the first portion 136 of the folded air lens structure 101 and is then projected through the first transmissive surface 102. The navigation image is relayed from the first transmissive surface 102, through the folded air lens 118, across the light reflector 106, back through the folded air lens 118, and to the second transmissive surface 104 of the folded air lens structure 101. In other words, the first transmissive surface 102 projects the light through the folded air lens 118 toward the light reflector 106, which reflects the light back toward the second transmissive surface 104. The light is then reflected from the reflective surface 110 and projected onto the image surface 114 where the image sensor 134 is located.

Figure 4B:
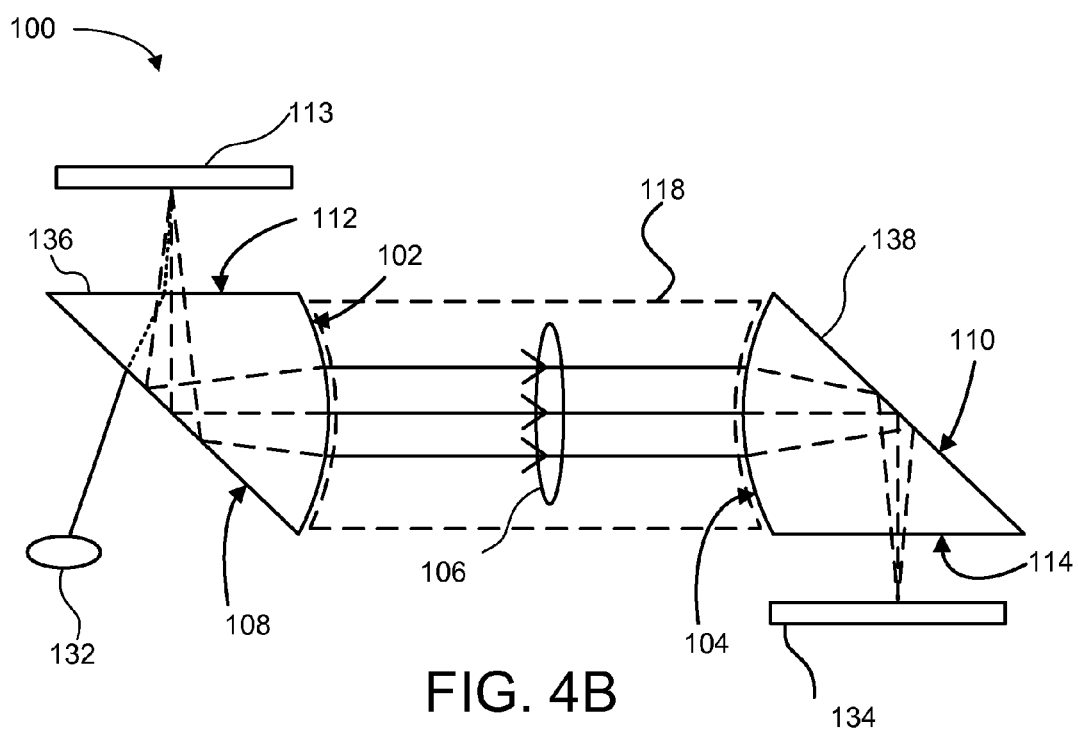
FIG. 4B depicts a functional view of another embodiment of the fingerprint navigation system of FIG. 2.

FIG. 4B illustrates a functional view of another embodiment of the fingerprint navigation system 100 of FIG. 2. Similar to FIG. 4A, FIG. 4B depicts the first and second portions 136 and 138 separately in order to illustrate the functionality of the folded air lens structure 101. However, embodiments of the folder air lens structure 101 combine the first and second portions 136 and 138 as a single unitary structure. In addition to the components listed above, FIG. 4B depicts a contact surface 113. The contact surface 113 of the fingerprint navigation system 100 is located at some distance from the object surface 112 of the folded air lens structure 101. The contact surface 113 provides an alternative tactile interface for the fingerprint navigation system 100. In this way, a user may touch a finger to the contact surface 113, while direct contact with the object surface 112 of the first portion 136 of the folded air lens structure 101 is avoided. One embodiment of the contact surface 113 is a pane of transparent material (glass, plastic, etc.) to allow light to pass from the light source 132 to a finger or other object on the contact surface 113 and reflect the light from the object to the folded air lens structure 101. The pane of transparent material may be formed on the object surface 112 or, alternatively, formed separately and placed on or near the object surface 112.

The first portion 136 and the second portion 138 of the folded air lens structure 101 may be manufactured of glass, plastic, or some other light-transmissive material having specific indices of refraction. Also, the first transmissive surface 102 and the second transmissive surface 104 may be manufactured to define different or identical focal lengths in the folded air lens 118 to achieve certain degrees of image magnification or reduction. In one embodiment, the first portion 136 and the second portion 138 are coupled in a unified structure, as is illustrated in FIG. 2 and FIG. 3. In some embodiments, the first transmissive surface 102 and the second transmissive surface 104 are oriented within a single plane at a non-zero angle relative to each other. In other words, the first transmissive surface 102 and the second transmissive surface 104 are aligned in a plane with the light reflector 106 so that the light from the first transmissive surface 102 and reflected by the light reflector 106 is directed toward the second transmissive surface 104 through the folded air lens 118. Hence, the light travels along a reflective path within the folded air lens 118 from the first transmissive surface 102 to the second transmissive surface 104 via the light reflector 106.

Embodiments of the light reflector 106 are designed to control at least one off-axis aberration that may be related to the navigation image at the image navigation sensor 134. The light reflector 106 may be manufactured with a radius size which corresponds to the optical properties of the folded air lens structure, the folded air lens 118, and/or the image navigation sensor 134. Additionally, the light reflector 106 may have one of a variety of canonical (e.g., circle, ellipse, square, triangle, etc.) or non-canonical shapes. The light reflector 106 may be located at a calculated distance from the first transmissive surface 102 and the second transmissive surface 104. Moreover, the light reflector 106 may be located at equal or unequal distances from the first transmissive surface 102 and the second transmissive surface 104. Additionally, the navigation image sensor 134 may be located at the image surface 114, or at some distance from the image surface 114, of the second portion 138 of the folded air lens structure 101.

Figure 5:
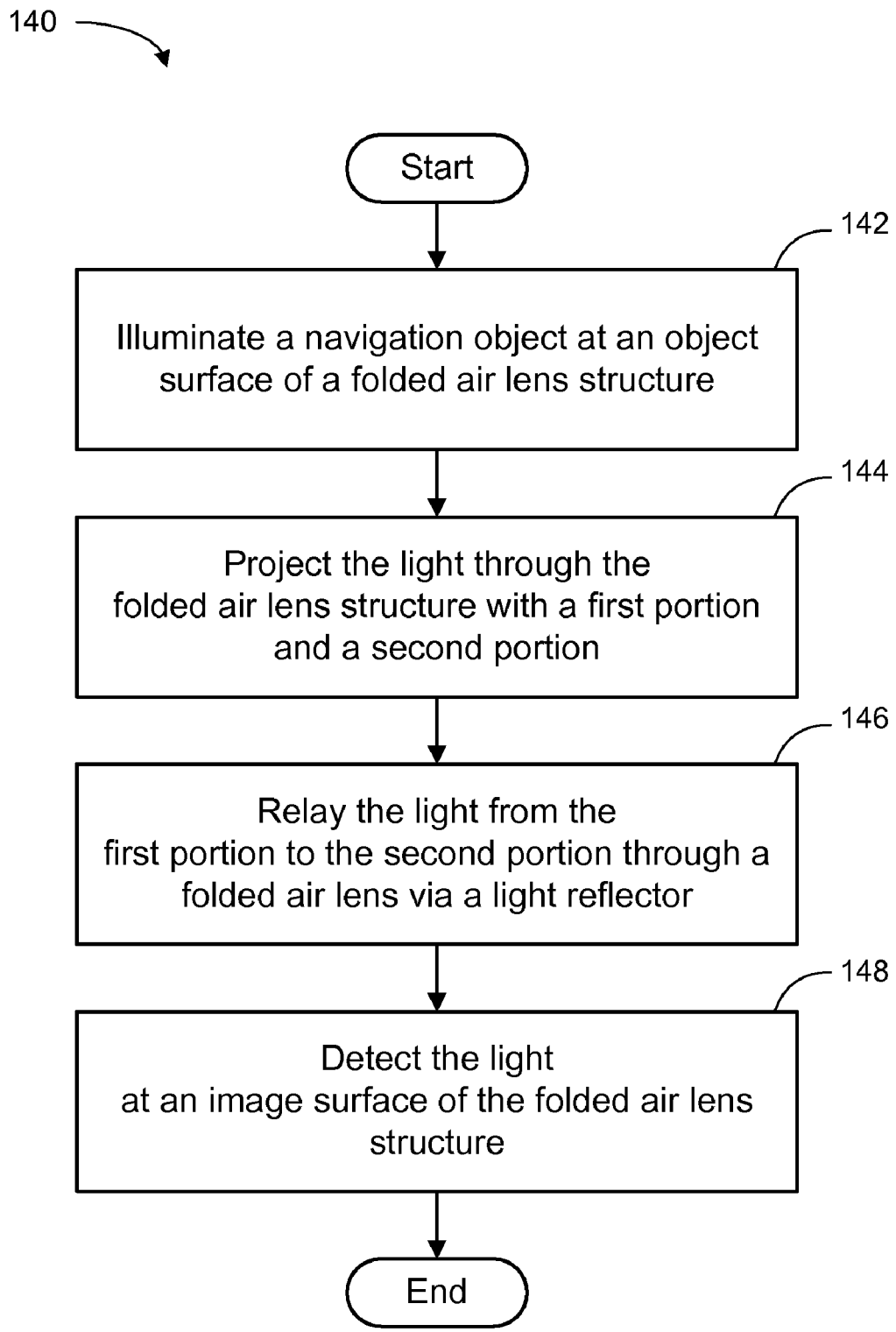
FIG. 5 depicts a schematic flow chart diagram of one embodiment of a method for using a fingerprint navigation system.

FIG. 5 depicts a schematic flow chart diagram of one embodiment of a method 140 for using a fingerprint navigation system 100. Although specific reference is made to the fingerprint navigation system 100 of FIG. 2, some embodiments of the method 140 may be implemented in conjunction with other fingerprint navigation systems.

At block 142, a light source 132 is used to illuminate a navigation object at an object surface 112 to reflect light to a folded air lens structure 101. One example of a light source is a light-emitting diode (LED), although many other types of light sources 132 may be implemented. At block 144, the folded air lens structure 101 is used to direct the light reflected from the navigation object. The folded air lens structure 101 includes first portion 136 and a second portion 138, as described above.

At block 146, the light reflector 106 relays the light from the first portion 136 of the folded air lens structure 101 through the folded air lens 118 to the second portion 138 of the folded air lens structure 101. As described above, the light reflector 106 may function to control at least one off-axis aberration from the navigation image produced at a navigation sensor 134. At block 148, the light is detected by the image navigation sensor 134 at the image surface 114. The navigation image produced by the navigation sensor 134 may be compared with previous images to detect the motion of an object located at the object surface 112. The depicted method 140 then ends.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A folded air lens structure comprising:
   an object surface of a first portion, the object surface to pass light to illuminate an object at the object surface;
   a first transmissive surface of the first portion, the first transmissive surface to direct the light from the object surface into a folded air lens, wherein an index of refraction of the first portion and an index of refraction of the folded air lens are not equal; and
   a second transmissive surface of a second portion, the second transmissive surface to accept the light from the folded air lens, wherein the first portion is coupled to the second portion within a unified structure, and the light travels along a reflective path within the folded air lens from the first transmissive surface to the second transmissive surface.

2. The folded air lens structure of claim 1, further comprising a first reflective surface of the unified structure to direct the light from the object surface to the first transmissive surface of the first portion.

3. The folded air lens structure of claim 2, further comprising a second reflective surface of the unified structure to direct the light from the second transmissive surface to an image surface of the second portion.

4. The folded air lens structure of claim 1, wherein the first transmissive surface and the second transmissive surface define first and second interfaces with the folded air lens, wherein the first and second interfaces have different focal lengths.

5. The folded air lens structure of claim 1, wherein the first portion and the second portion have different indices of refraction.

6. The folded air lens structure of claim 1, wherein the first transmissive surface and the second transmissive surface are oriented at a non-zero angle relative to each other.

7. The folded air lens structure of claim 1, wherein the first transmissive surface and the second transmissive surface define at least a portion of the folded air lens which corresponds to the reflective path between the first transmissive surface and the second transmissive surface.

8. A fingerprint navigation system comprising:
   a light source;
   a folded air lens structure to direct light from the light source to an object surface, wherein the folded air lens structure comprises a first portion and a second portion;
   a light reflector to direct the light from the first portion of the folded air lens structure to the second portion of the folded air lens structure; and
   a navigation sensor to produce a navigation image from the light detected at the navigation sensor.

9. The fingerprint navigation system of claim 8, wherein the folded air lens structure and the light reflector define at least a portion of a folded air lens.

10. The fingerprint navigation system of claim 9, wherein the first portion is configured to direct the light into the folded air lens and the second portion is configured to receive light from the folded air lens, the folded air lens to apply a magnification factor to the navigation image produced by the navigation sensor.

11. The fingerprint navigation system of 8, wherein the light source is configured to illuminate an object at the object surface.

12. The fingerprint navigation system of claim 8, further comprising an air gap between a first transmissive surface of the first portion and the light reflector.

13. The fingerprint navigation system of claim 12, further comprising an air gap between the light reflector and a second transmissive surface of the second portion.

14. The fingerprint navigation system of claim 8, wherein the second portion is configured to direct the light to an image surface at the navigation sensor.

15. The fingerprint navigation system of claim 8, wherein the light reflector is configured to reflect a portion of the light to control an off-axis aberration of the navigation image produced at the navigation sensor.

16. A method for using a fingerprint navigation system, the method comprising:

illuminating a navigation object at an object surface of a folded air lens structure to reflect light from the navigation object;

directing the reflected light through the folded air lens structure, wherein the folded air lens structure comprises a first portion and a second portion;

relaying the reflected light from the first portion to the second portion through a folded air lens via a light reflector; and detecting the reflected light to produce a navigation image.

17. The method of claim 16, further comprising directing the light from a first transmissive surface of the first portion through the folded air lens to the light reflector.

18. The method of claim 17, further comprising directing the light from the light reflector through the folded air lens to a second transmissive surface of the second portion.

19. The method of claim 16, further comprising correcting at least one off-axis aberration of the navigation image.

20. The method of claim 16, further comprising generating a navigation signal for a user interface indicator based on a sequence of navigation images.

\* \* \* \* \*